US012467625B2

(12) United States Patent
Tunstall

(10) Patent No.: US 12,467,625 B2
(45) Date of Patent: Nov. 11, 2025

(54) PASSIVELY COOLED ALUMINUM BARBECUE PIT

(71) Applicant: HIGH PERFORMANCE COOKERS LLC, Abita Springs, LA (US)

(72) Inventor: Todd Bard Tunstall, Madisonville, LA (US)

(73) Assignee: Predator Grills, LLC, Madisonville, LA (US)

( * ) Notice: Subject to any disclaimer, the term of this patent is extended or adjusted under 35 U.S.C. 154(b) by 645 days.

(21) Appl. No.: 17/744,939

(22) Filed: May 16, 2022

(65) Prior Publication Data

US 2022/0364723 A1    Nov. 17, 2022

Related U.S. Application Data

(60) Provisional application No. 63/188,839, filed on May 14, 2021.

(51) Int. Cl.
*F23D 14/58* (2006.01)
*A47J 37/07* (2006.01)

(52) U.S. Cl.
CPC .......... *F23D 14/58* (2013.01); *A47J 37/0713* (2013.01); *F23D 2200/00* (2013.01); *F23D 2212/20* (2013.01); *F23D 2900/14061* (2013.01); *F23D 2900/14582* (2013.01)

(58) Field of Classification Search
CPC .......... F23D 2200/00; F23D 2203/1012; A47J 37/0713
See application file for complete search history.

(56) References Cited

U.S. PATENT DOCUMENTS

| D914,451 S | * | 3/2021 | Boltz | D7/409 |
| 2016/0069564 A1 | * | 3/2016 | Ahmed | F23D 14/10 |
| | | | | 126/39 E |
| 2017/0202394 A1 | * | 7/2017 | Olsen | A47J 37/0704 |
| 2018/0070770 A1 | * | 3/2018 | Ahmed | F23D 14/70 |

\* cited by examiner

*Primary Examiner* — Ko-Wei Lin
(74) *Attorney, Agent, or Firm* — Gregory Ozga; Warn Partners, P.C.

(57) ABSTRACT

A powder coated aluminum barbecue pit burner that burns gas in the same way that stainless steel burner tubes do, but last longer and do not rust. The use of powder coated aluminum makes the burner according to the present invention corrosion resistant. Additionally, the powder coated aluminum burner of the present invention also contain a heat sink element that prevents the temperature of the tubes from getting too high. Controlling temperature and using powder coated aluminum burners, instead of stainless steel, ensures that the burner will last longer. Another embodiment utilizes a water cooled system in connection with the heat sink element.

24 Claims, 8 Drawing Sheets

PASSIVELY COOLED ALUMINUM BARBECUE PIT

FIELD OF THE INVENTION

The present invention relates to a new barbecue design incorporating heat control features for protecting the internal components.

BACKGROUND OF THE INVENTION

Most propane or natural gas fueled barbecue grills or pits (hereafter also referred to as "barbecue" or "barbecues") on the market today use stainless steel burner tubes. The stainless steel burner tubes start losing their performance and degrade within six months, and depending on their environment they will rust out and require replacement in two or three years. The problem with stainless steel burner tubes is that after they are fired for the first time, they begin oxidizing due to extremely high temperatures during operation. The high temperatures cause nickel, chromium, and other materials in the stainless steel to degrade and at the same time moisture in the air can form condensate in the stainless steel burner tubes, all of which makes the steel susceptible to oxidation and the formation of rust. As a result, most stainless steel burner tubes will have to be replaced several times during the operational life of the barbecue. It is therefore desirable to develop burner tubes for a barbecue that will last longer and be less susceptible to rust. It is also desirable to lower the surface temperature of the firebox, grease traps and burners in the barbecue to prevent grease fires.

SUMMARY OF THE INVENTION

The present invention provides a powder coated aluminum barbecue pit burner that burns gas in the same way that stainless steel burner tubes do, but last longer and does not rust. The use of powder coated aluminum makes the burner corrosion resistant. The powder coated aluminum burner of the present invention also includes a heat sink element that prevents the temperature of the burner from getting too high. Controlling temperature and using powder coated aluminum burners, instead of stainless steel, ensures that the burner will last longer.

One embodiment of the invention is directed to a burner construction for use with combustible fuel. The combustible fuel used can be propane, natural gas, or any other suitable combustible gas. The burner construction includes a burner formed from powder coated aluminum. The burner has a longitudinal passage with an inlet connected to the longitudinal passage. The longitudinal passage receives combustible fuel through an inlet and the combustible fuel is combusted in the longitudinal passage. There are a plurality of combustion holes along the exterior of the burner that extend into the longitudinal passage. These holes allow flames and heat to leave the longitudinal passage. The burner construction further includes at least one powder coated aluminum heat sink with a first end connected to the burner extending away from the burner terminating at a second end.

Another aspect of the invention is directed to a barbecue arrangement, which in one embodiment includes the burner construction described above. The barbecue arrangement includes a firebox with an exterior that has a bottom surface and a plurality of perpendicular sides extending from the bottom surface of the exterior. The firebox also has an interior having a bottom surface and a plurality of perpendicular sides extending from the bottom surface of the interior.

Within the firebox is at least one burner formed from powder coated aluminum. The burner includes a longitudinal passage formed in the burner that has an inlet connected to the longitudinal passage. Combustible gas is flowed into through the inlet into the longitudinal passage where it is combusted. The at least one burner includes a plurality of combustion holes along the exterior of the burner that extend into the longitudinal passage. The combustion holes allow for flames and heat to leave the longitudinal passage.

Connected to the at least one burner is at least one heat sink having a first end connected to the burner and extending away from the burner terminating at a second end. There is also a thermal management device in contact with the second end of the at least one heat sink for removing heat transferred from the at least one burner to the at least one heat sink.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 2:
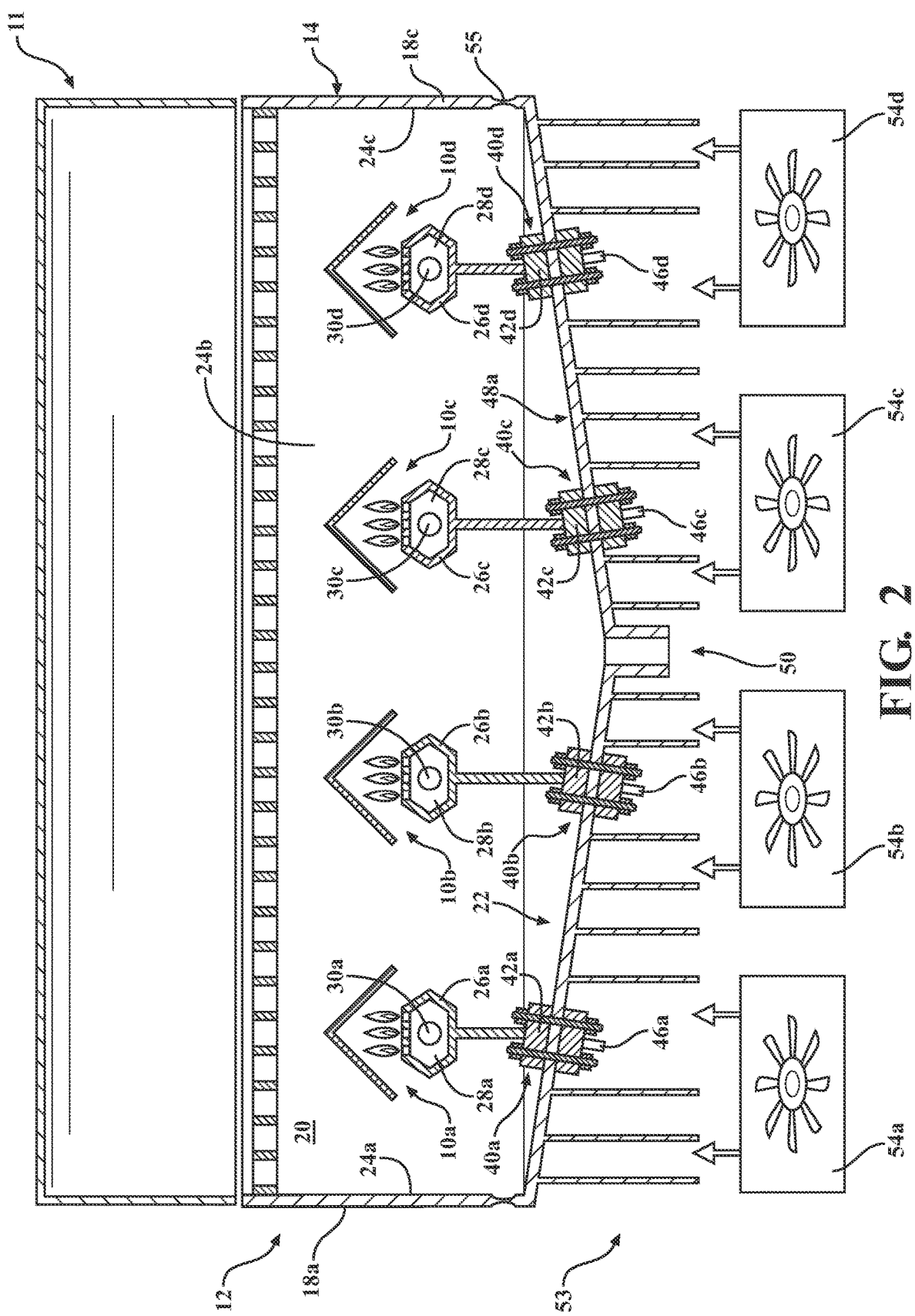
FIG. 2 is a cross-sectional elevational schematic view of a barbecue arrangement according to a first embodiment of the present invention.
Figure 5:
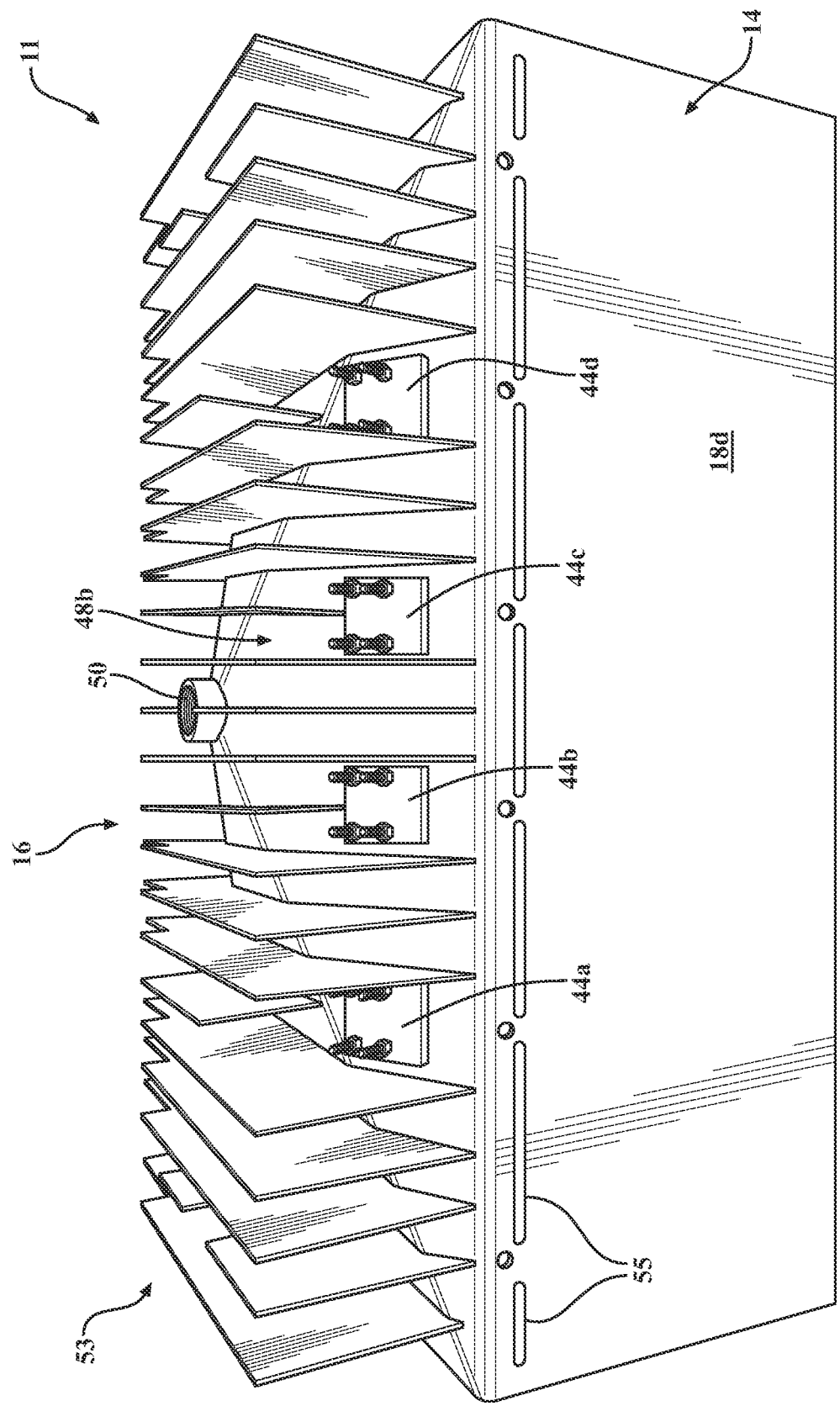
FIG. 5 is a bottom perspective view of the barbecue arrangement according to the first embodiment of the invention.
Figure 6:
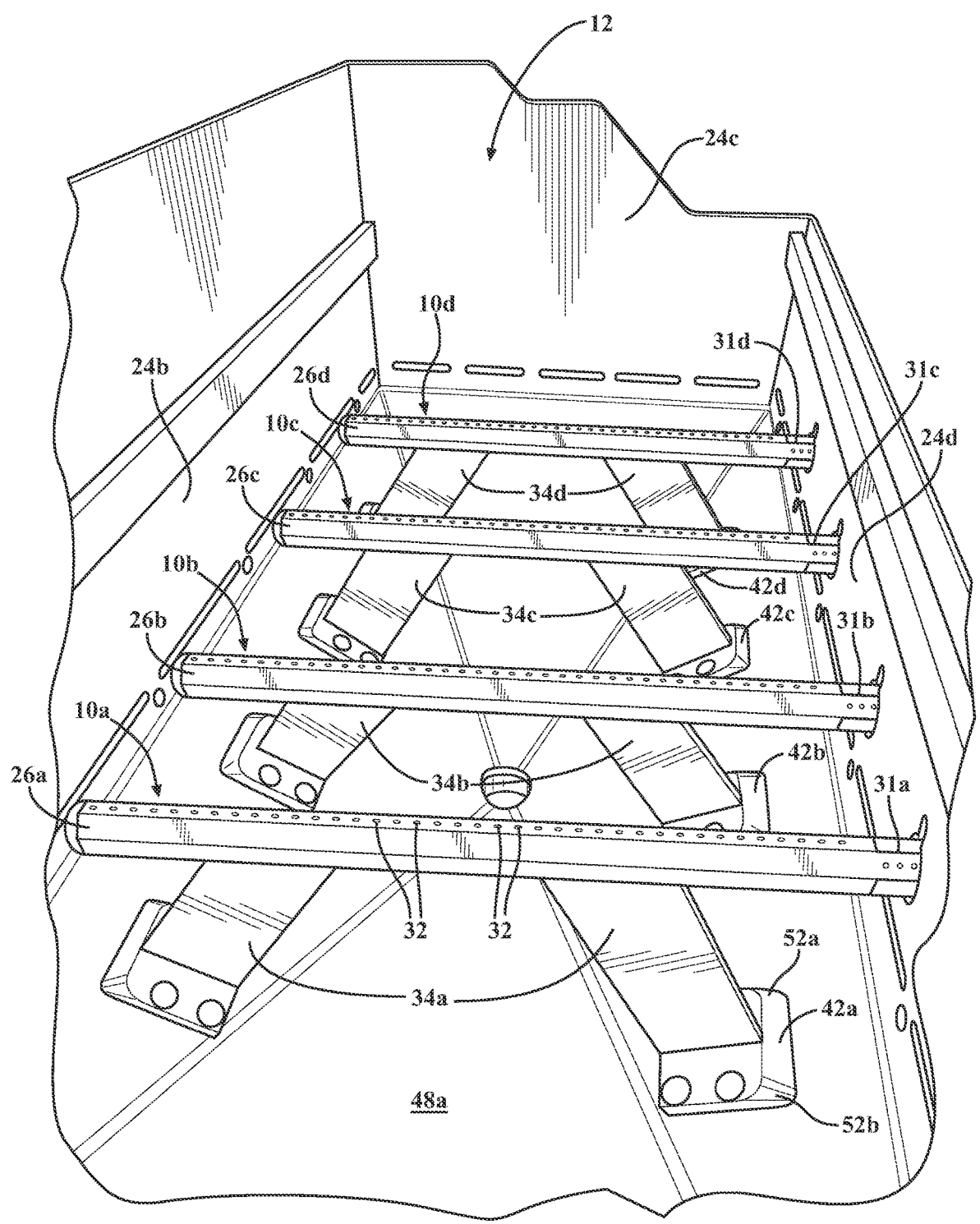
FIG. 6 is an enlarged perspective view of a portion of the barbecue arrangement according to the first embodiment of the invention.

Referring now to FIGS. 2, 5 and 6 burner constructions 10a, 10b, 10c, 10d used in connection with a barbecue arrangement 11 are shown and described. The burner construction as shown is mounted within a firebox 12 of the barbecue arrangement 11. However, it is within the scope of the invention for the burner constructions 10a, 10b, 10c, 10d to be implemented in any type of barbecue, over, grill, stove or cooking device that utilizes combustion gas. As shown in FIGS. 2, 5 and 6 the barbecue arrangement has four separate burner constructions 10a, 10b, 10c, 10d.

The firebox 12 includes an exterior that has a bottom surface 16 and a plurality of perpendicular sides 18a, 18b, 18c, 18d extending from the bottom surface 16 of the exterior 14. The firebox 12 further includes an interior 20 that has a bottom surface 22 and a plurality of perpendicular sides 24a, 24b, 24c, 24d extending from the bottom surface 22 of the interior 20. On the perpendicular sides 18a, 18b, 18c, 18d, 24a, 24b, 24c, 24d there are also one or more thermal breaks 55 extending through the perpendicular sides 18a, 18b, 18c, 18d of the exterior 14 to the plurality of perpendicular sides 24a, 24b, 24c, 24d of the interior 20. The thermal breaks 55 help to cool the firebox. The same thermal breaks are found in all embodiments of the invention and are shown in the drawings.

Each burner construction 10a, 10b, 10c, 10d has includes a burner 26a, 26b, 26c, 26d formed from powder coated aluminum and contained within the firebox 12 interior 20. Each burner 26a 26b, 26c, 26d includes a longitudinal passage 28a, 28b, 28c, 28d formed in the burner 26a 26b, 26c, 26d, respectively. Each burner 26a, 26b, 26c, 26d has an inlet 30a, 30b, 30c, 30d connected to the longitudinal passage 28a, 28b, 28c, 28d and each longitudinal passage 28a, 28b, 28c, 28d receives combustible gas through the inlet which is combusted in the longitudinal passage. Each burner 26a, 26b, 26c 26d has a mixing venturi 31a, 31b, 31c, 31d formed in the burner 26a, 26b, 26c, 26d adjacent the inlet 30a, 30b, 30c, 30d that includes holes for providing air to be mixed with the combustible gas. Each burner 26a, 26b, 26c, 26d has a plurality of combustion holes 32 (see burner 26a in FIG. 6) along the exterior of the burner 26a, 26b, 26c, 26d that extend into the longitudinal passage to allow combusting gas and heat in the respective longitudinal passage 28a, 28b, 28c, 28d to escape and heat the firebox 12.

Each burner construction 10a, 10b, 10c, 10d includes a heat sink 34a, 34b, 34c, 34d which as shown are two legs extending away from the respective burner 26a, 26b, 26c, 26d. While two legs are shown it is within the scope of this invention for the heat sink 34a, 34b, 34c, 34d to be a single panel. The heat sink 34a, 34b, 34c, 34d has a first end connected to a respective burner 26a, 26b, 26c, 26d and extending away from the burner 26a, 26b, 26c, 26d and terminating at a second end. The second end is in contact with a thermal management device 40a, 40b, 40c, 40d for removing heat transferred from the respective heat sink 34a, 34b, 34c, 34d.

Each thermal management device 40a, 40b, 40c, 40d includes a first block 42a, 42b, 42c, 42d in contact with the second end of the heat sink 34a, 34b, 34c, 34d and the bottom surface 22 of the interior 20 of the firebox 12. A second block 44a, 44b, 44c, 44d is connected to the bottom surface 16 of the exterior 14 of the firebox 12. Each first block 42a, 42b, 42c, 42d is aligned with a respective one of the second block 44a, 44b, 44c, 44d of the thermal management device 40a, 40b40c, 40d and are held together using one or more fasteners that extend from the first block 42a, 42b, 42c, 42d, through the firebox 12 to the second block 44a, 44b, 44c, 44d so that a portion of the firebox 12 is positioned between the first block 42a, 42b, 42c, 42d and the second block 44a, 44b, 44c, 44d.

The bottom surface 16 of the exterior 14 and the bottom surface 22 of the interior 20 a plurality of sloped sections 48a, 48b that direct liquids such as water and liquid grease toward a grease outlet 50. The first block 42a, 42b, 42c, 42d has two rounded corners 52a, 52b (two are labelled in FIG. 5) that prevent grease from collecting on the two rounded corners 52a, 52b of the first block 42a, 42b, 42c, 42d as liquid flows past on the sloped section 48a of the interior 20.

The second block 44a, 44b, 44c, 44d each have a resistor 46a, 46b, 46c, 46d connected to the second block 44a, 44b, 44c, 44d for heating the thermal management device 40a, 40b40c, 40d using an electric power source connected to each resistor 46a, 46b, 46c, 46d. When the barbecue arrangement 11 is not in use the resistor 46a, 46b, 46c, 46d heats the thermal management device 40a, 40b, 40c, 40d and the bottom surface 22 of the interior 20 of the firebox 12 to prevent grease from solidifying and building up.

The barbecue arrangement 11 as shown in FIGS. 2 and 5 has a plurality of cooling fins 53 connected to the bottom surface 16 of the exterior 14 of the firebox 12. The cooling fins 53 are connected by welding or soldering (depending on the materials use) or they can be connected using adhesives or fasteners. The plurality of cooling fins 53 draw heat away from the firebox 12, thereby cooling the firebox 12 and the burner constructions 10a, 10b, 10c, 10d, which are already thermally connected to the firebox 12 through the thermal management device 40a, 40b, 40c, 40d. FIG. 2 also shows that the barbecue arrangement 11 has fans 54a, 54b, 54c, 54d positioned relative to the cooling fins 53 for blowing air past the cooling fins 53 to remove heat. While four fans are shown it is within the scope of this invention for a greater or lesser number of fans to be used.

The barbecue arrangement 11 of the present invention lowers the surface temperature of the burner 26a, 26b, 26c, 26d and the firebox 12 by using the cooling fans 54a, 54b, 54c, 54d in combination with the cooling fins 54, heat sink 34a, 34b, 34c, 34d and respective thermal management device 40a, 40b, 40c, 40d. Lowering the temperature of the barbecue arrangement 11 helps to prolong the life of the burner 26a, 26b, 26c, 26d, firebox 12 and other components by preventing grease fires, oxidation and warping.

Figure 1:
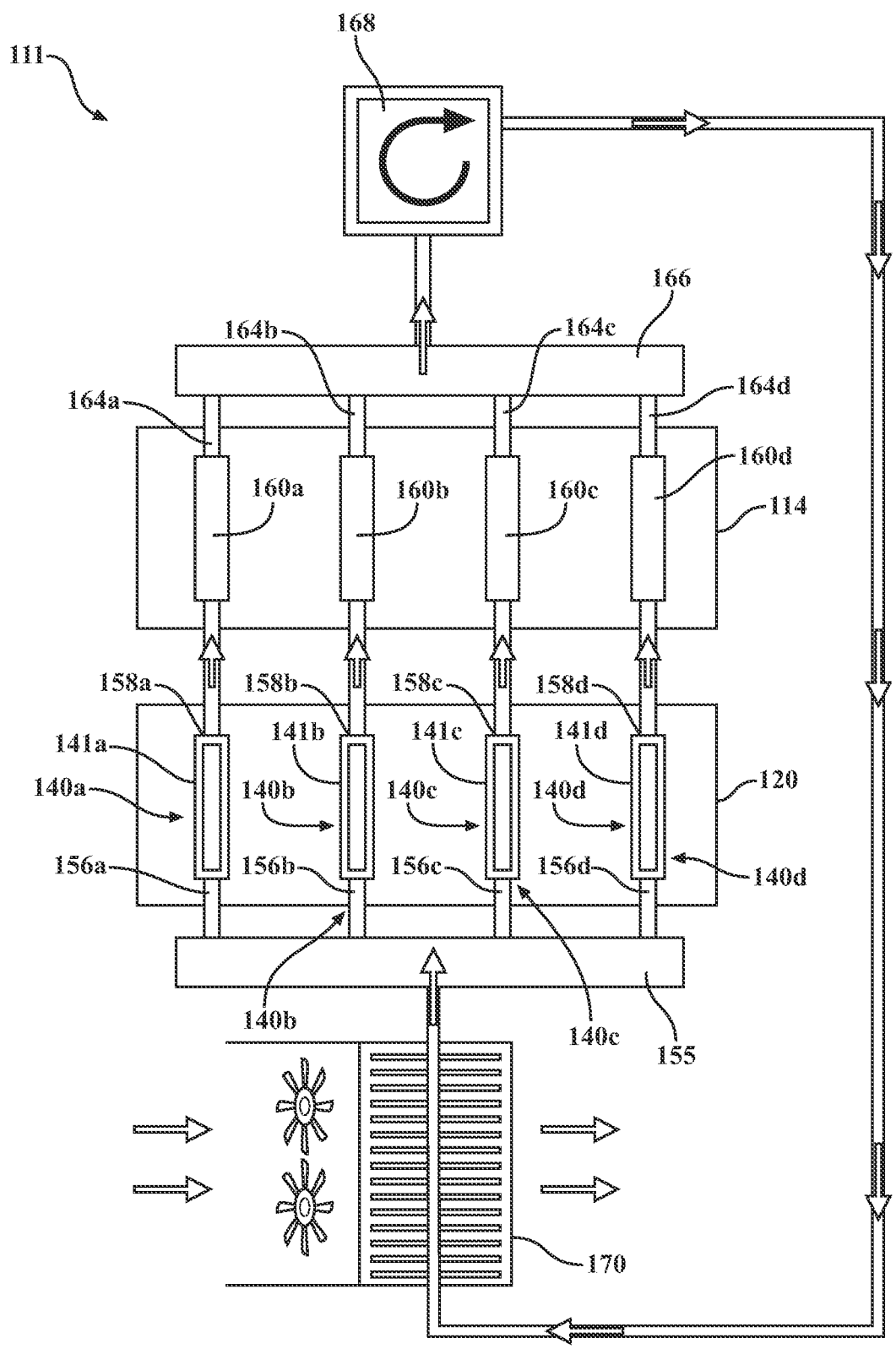
FIG. 1 is a schematic view of a barbecue arrangement according to a second embodiment of the present invention.
Figure 4:
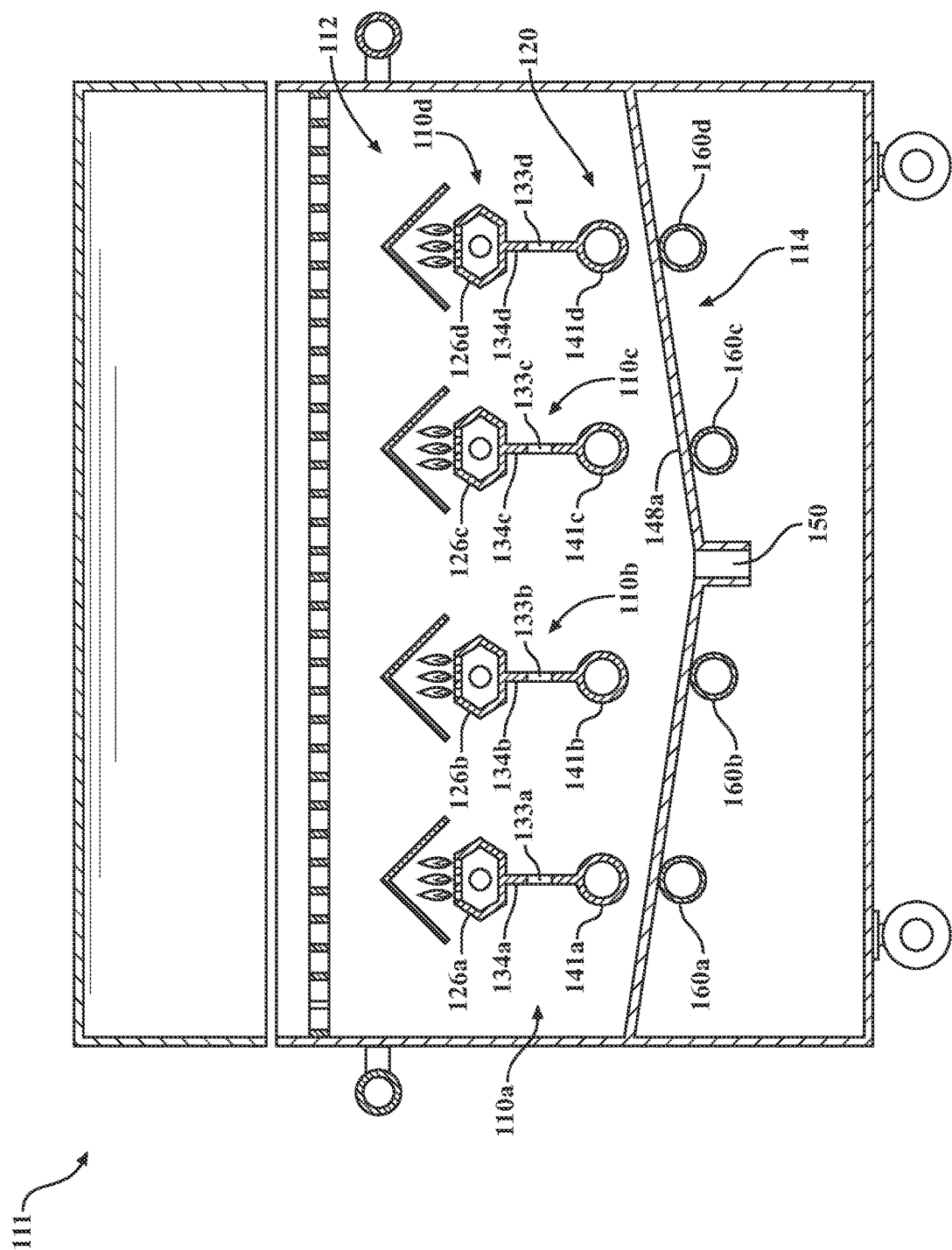
FIG. 4 is a cross-sectional elevational schematic view of the barbecue arrangement according the second embodiment of the present invention.
Figure 7:
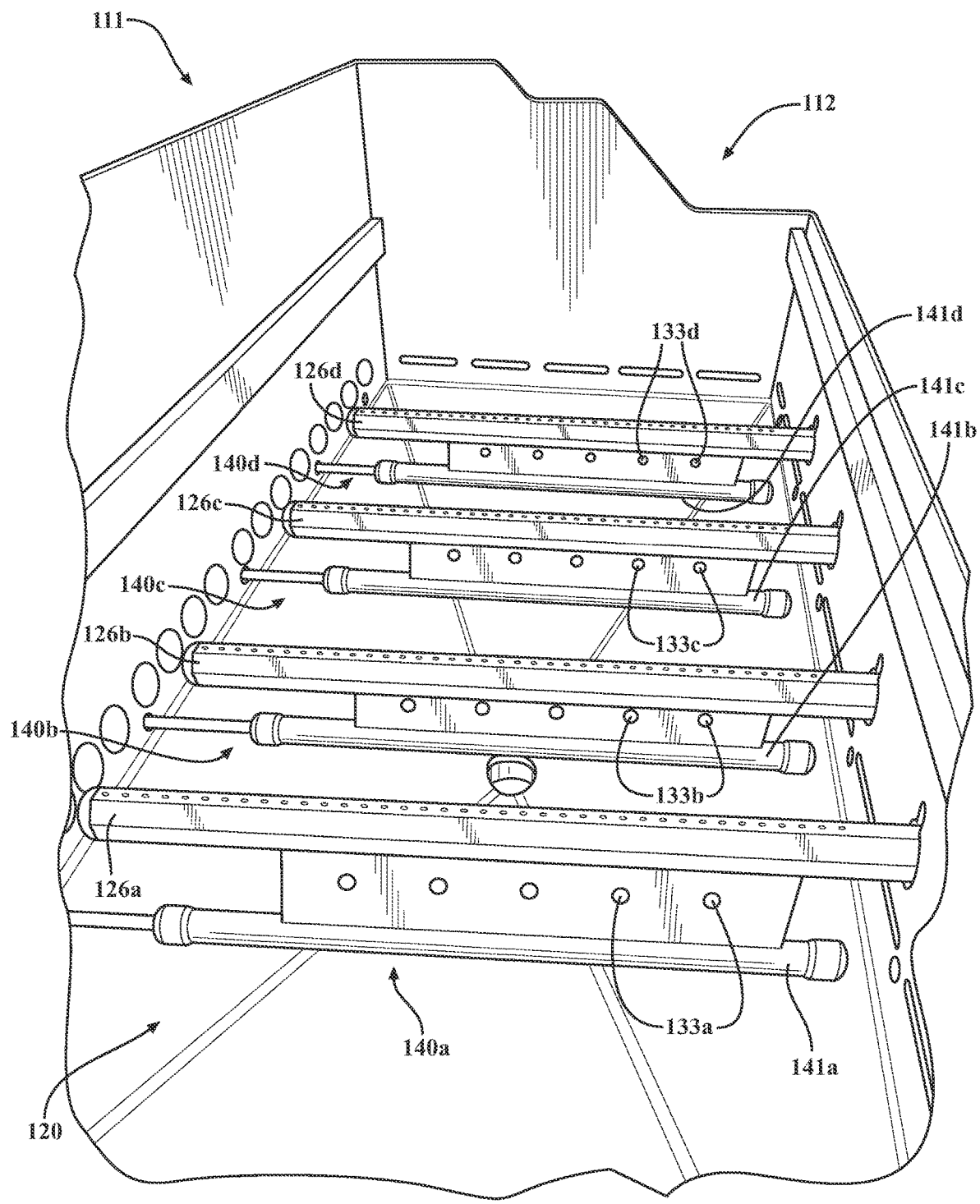
FIG. 7 is an enlarged perspective view of a portion of the barbecue arrangement according to the second embodiment of the invention.

Referring now to FIGS. 1, 4 and 7 a barbecue arrangement 111 according to another embodiment of the invention is shown. The barbecue arrangement 111 utilizes a firebox 112 similar in construction to the one shown in the first embodiment of the invention. The firebox 112 has an interior 120 and exterior 114. The firebox 112 has the sloped sections 148a, 148b of a bottom surface 122 of an interior 120 and a bottom surface 116 of an exterior 114 leading to a grease outlet 150. However, it is within the scope of the invention for the bottom surface of the firebox to be flat.

In this embodiment of the invention there is a burner construction 110a, 110b, 110c, 110d shown. While four burner constructions 110a, 110b, 110c, 110d are shown it is within the scope of the invention for a great or lesser number to be used. Each burner construction 110a, 110b, 110c, 110d has a burner 126a, 126b, 126c, 126d that has an inlet, combustion holes and mixing venturi like the burner 26a, 26b, 26c, 26d described above. Each burner 126a, 126b, 126c, 126d has a heat sink 134a, 134b, 134c, 134d connected to the burner 126a, 126b, 126c, 126d. Each heat sink 134a, 134b, 134c, 134d is connected at a first end to the respective burner 126a, 126b, 126c, 126d and at a second end to a thermal management device 140a, 140b140c, 140d. In the present embodiment of the invention the thermal management device 140a, 140b140c, 140d is a burner cooling tube 141a, 141b, 141c, 141d extending through the firebox 112, wherein the burner cooling tube 141a, 141b, 141c, 141d has an inlet 156a, 156b, 156c, 156d that receives cooling fluid from in intake manifold 155 and an outlet 158a, 158b, 158c, 158d where cooling fluid flows through the cooling tube and removes heat transferred from the respective heat sink 134a, 134b, 134c, 134d. In some embodiments each heat sink 134a, 134b, 134c, 134d includes one or more holes 133a, 133b, 133c, 133d that provide a thermal break to prevent too much heat from being transferred away from the burner 126a, 126b, 126c, 126d. The cooling fluid can be water, anti-freeze, or any other suitable cooling fluid.

Referring now to FIG. 1 the barbecue arrangement 111 schematically shows the flow of cooling fluid through the barbecue arrangement 111. Each thermal management device 140a, 140b, 140c, 140d further includes a firebox cooling tube 160a, 160b, 160c, 160d each having a respective inlet 162a, 162b, 162c, 162d that is downstream and receives cooling fluid from the outlet 162a, 162b, 162c, 162d of the burner cooling tube 141a, 141b141c, 141d. Each firebox cooling tube 160a, 160b, 160c, 160d is connected to the exterior 114 of the firebox 112. While shown as being on the exterior 114 of the firebox 112 it is within the scope of the invention for each firebox cooling tube 160a, 160b, 160c, 160d to be located on the interior 120 of the firebox 112. Each firebox cooling tube 160a, 160b, 160c, 160d has cooling fluid that absorbs heat from the firebox 112 which exits through the outlet 164a, 164b, 164c, 164d of the firebox cooling tube 160a, 160b, 160c and is collected in an exhaust manifold 166. The barbecue arrangement 111 further includes a recirculation pump 168 connected to the exhaust manifold 166 and pumps cooling fluid through a heat exchanger 170 and into the intake manifold 155. It is within the scope of this invention for the position of the recirculation pump 168 and heat exchanger 170 to in different positions in the system. The barbecue arrangement 111 of the present invention lowers the surface temperature of the burner 126a, 126b, 126c, 126d and the firebox 112 by using the cooling fluid. Lowering the temperature of the barbecue arrangement helps to prolong the life of the burner 126a, 126b, 126c, 126d, firebox 112 and other components to prevent grease fires, oxidation and warping.

Figure 3:
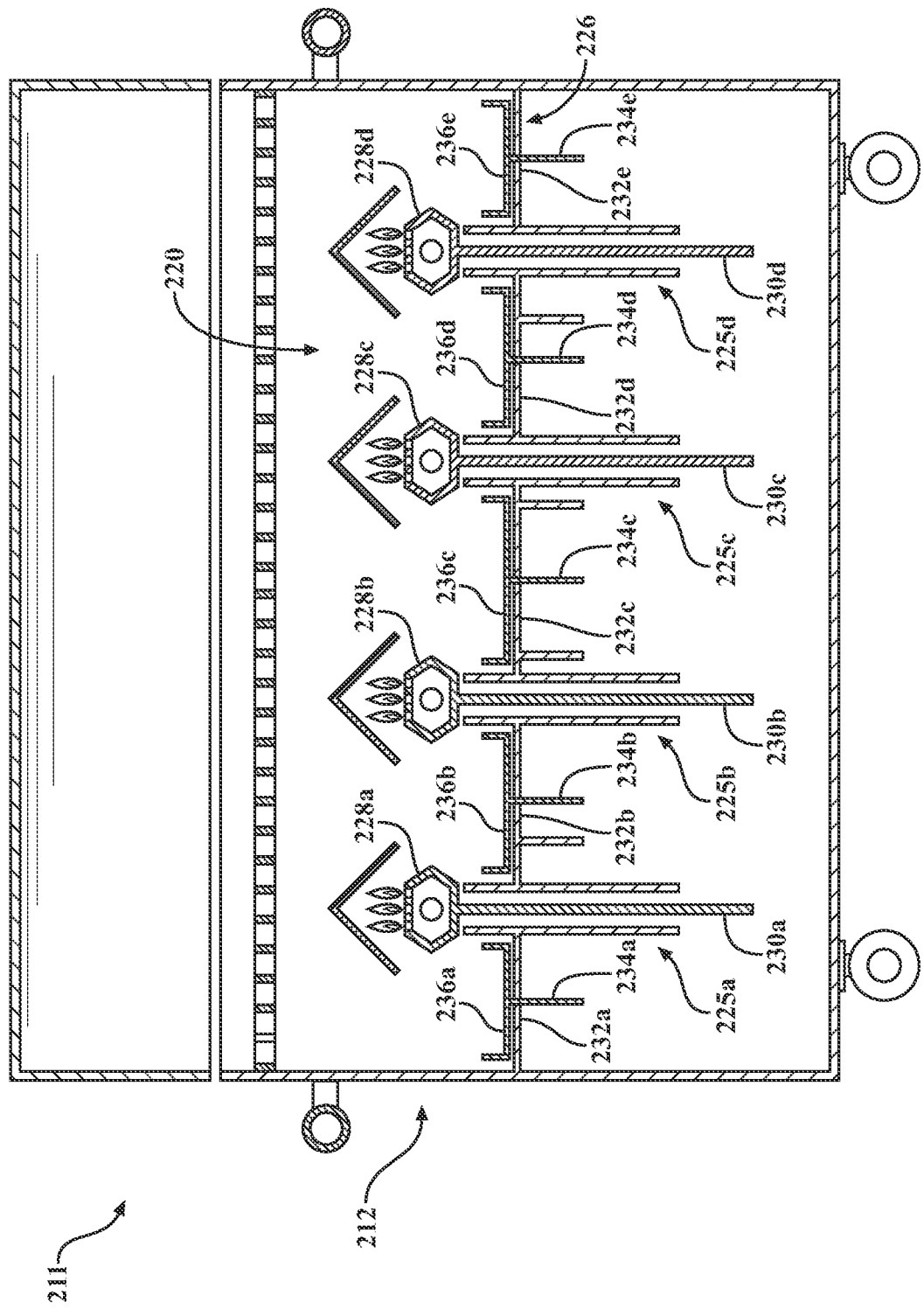
FIG. 3 is a cross-sectional elevational schematic view of a barbecue arrangement according to a third embodiment of the present invention.
Figure 8:
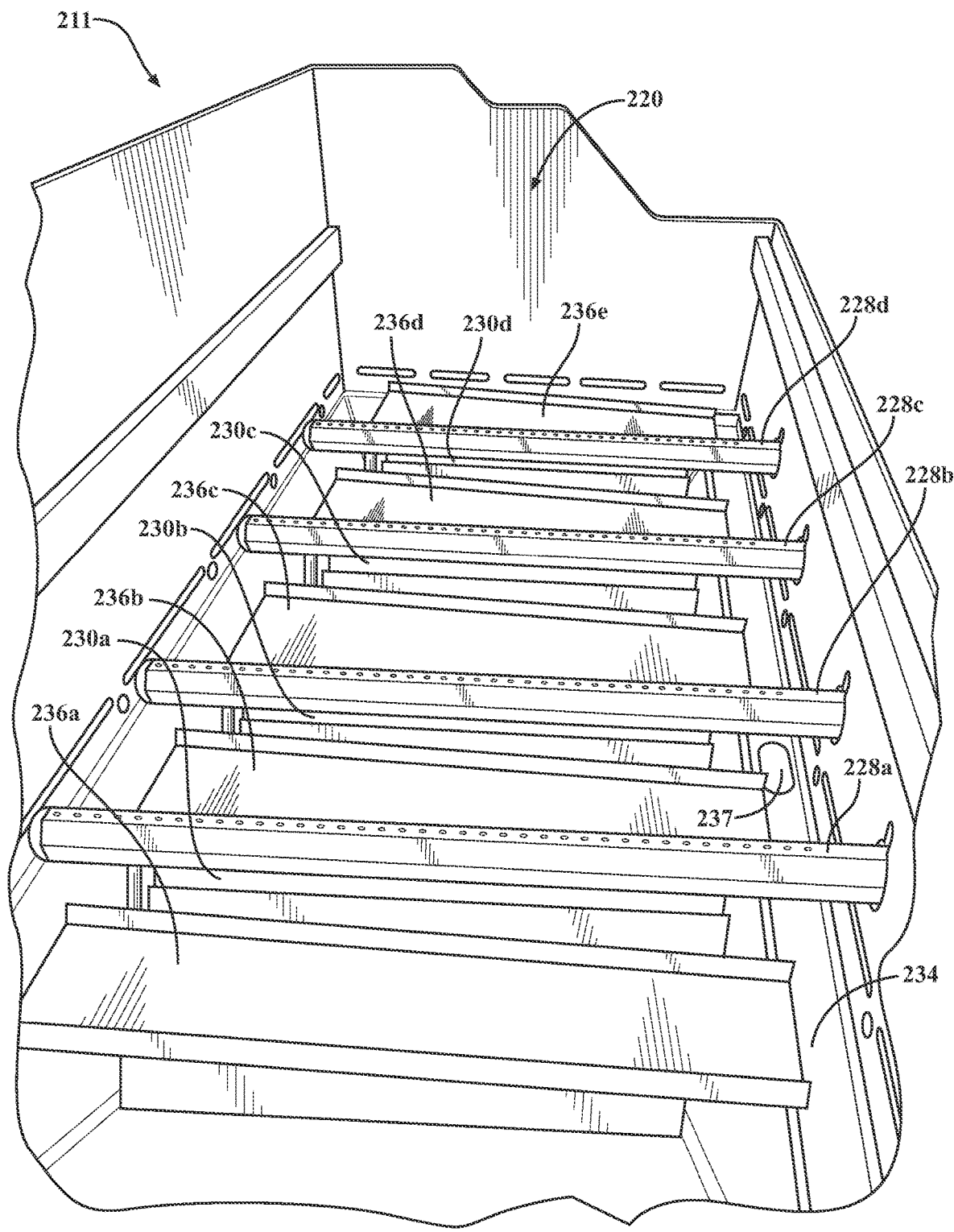
FIG. 8 is an enlarged perspective view of a portion of the barbecue arrangement according to the third embodiment of the invention.

Referring now to FIGS. 3 and 8 a barbecue arrangement 211 according to a third embodiment of the invention is shown and described. This embodiment of the invention uses ambient air to cool the barbecue arrangement and the use of cooling fans is optional. The barbecue arrangement has a firebox 212 that has a bottom surface 222 of an interior 220 that is flat. A burner slot 224a, 224b, 224c, 224d is formed on the bottom surface 222 and extends to an outside bottom surface 226 of the firebox 212. In the present embodiment of the invention there are four burner slots shown, however, there can be a greater or lesser number depending on the number of burners being utilized in the barbecue arrangement 211. Adjacent to each burner slot 224a, 224b, 224c, 224d is a cool air inlet guide 225a, 225b, 225c, 225d adjacent from the respective burner slot 224a, 224b, 224c, 224d and extending perpendicular to the outside bottom surface 226. The cool air inlet guide 225a, 225b, 225c, 225d allows air to flow up into the interior 220 of the firebox 212 from the outside bottom surface 226.

The barbecue arrangement 211 further includes a burner 228a, 228b, 228c, 228d formed from aluminum for combusting fuel and emitting heat. Each burner 228a, 228b, 228c, 228d has a heat sink 230a, 230b, 230c, 230d formed of aluminum sheet that is connected to a burner 228a, 228b, 228c, 228d respectively. The heat sink 230a, 230b, 230c, 230d extends away from the burner 228a, 228b, 228c, 228d and has a portion that extends through a respective burner slot 224a, 224b, 224c, 224d; and past the outside bottom surface 226 of the firebox 212 so that portion of the heat sink 230a, 230b, 230c, 230d is outside of the firebox 212. A portion of the heat sink 230a, 230b, 230c, 230d and the burner 228a, 228b, 228c, 228d is positioned in the interior 220 of the firebox 212. The heat sink 230a, 230b, 230c, 230d of each burner 228a, 228b, 228c, 228d helps to lower the temperature of the burner 228a, 228b, 228c, 228d, while allowing the combustion heat of the gas to heat the firebox 212 for cooking foods. Lowering the temperature of the burner 228a, 228b, 228c, 228d the helps to prolong the life of the burner.

The barbecue arrangement 211 further includes a drip tray slot 232a, 232b, 232c, 232d, 232e formed on the bottom surface 222 of the firebox 212. Each drip tray slot 232a, 232b, 232c, 232d, 232e receives a heat sink 234a, 234b, 234c, 234d, 234e extending from a drip tray 236a, 236b, 236c, 236d, 236e. The drip tray 236a, 236b, 236c, 236d, 236e catches grease and other liquid from the cooking surface and the heat sink 234a, 234b, 234c, 234d, 234e of each respective drip tray 236a, 236b, 236c, 236d, 236e helps to keep the grease and liquid cool so it does not ignite. Also, the drip tray 236a, 236b, 236c, 236d, 236e can be removed for cleaning.

Each drip tray 236a, 236b, 236c, 236d, 236e is formed of aluminum and has a top surface angled toward a grease trough 234. The grease trough 234 is formed of aluminum and connectable to the bottom surface of the firebox 212. The grease trough 234 has a top surface angled toward an outlet 237 to where grease and liquid is removed from the firebox 212.

In all embodiments of the invention the burners, drip trays, grease troughs, heat sinks and the interior of the firebox is optionally powder coated with a high temperature polyester powder coat material. Suitable powder coat materials include but are not limited to a high temperature powder coat material consisting essentially of barium sulfate, carbon black and silica.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. A burner construction for use with combustible fuel comprising:
a burner formed from powder coated aluminum;
a longitudinal passage formed in the burner, with an inlet connected to the longitudinal passage, wherein the longitudinal passage receives combustible fuel through inlet and the combustible fuel is combusted in the longitudinal passage;
a plurality of combustion holes along an exterior of the burner and extending into the longitudinal passage, and
at least one heat sink formed of powder coated aluminum and having a first end that is connected to the burner and extends away from the burner terminating at a second end.

2. The burner construction of claim 1 further comprising a thermal management device connected to the second end of the at least one heat sink.

3. The burner construction of claim 2 wherein the thermal management device has a first block and a second block connected together.

4. The burner construction of claim 3 wherein the first block has at least two rounded corners that prevent grease from collection on the at least two rounded corners of the first block.

5. The burner construction of claim 1 wherein the burner is powder coated with a high temperature polyester powder coat material.

6. The burner construction of claim 1 wherein the burner is powder coated with a high temperature powder coat material consisting essentially of barium sulfate, carbon black and silica.

7. A barbecue arrangement comprising:
a firebox with an exterior that has a bottom surface and a plurality of perpendicular sides extending from the bottom surface of the exterior, and an interior that has a bottom surface and a plurality of perpendicular sides extending from the bottom surface of the interior;
at least one burner formed from powder coated aluminum and mounted in the interior of the firebox;
at least one heat sink having a first end connected to the at least one burner and extending away from the at least one burner and terminating at a second end, and
a thermal management device in contact with the second end of the at least one heat sink for removing heat transferred through the at least one heat sink from the at least one burner.

8. The barbecue arrangement of claim 7 wherein the thermal management device includes a first block in contact with the second end of the at least one heat sink and bottom surface of the interior of the firebox.

9. The barbecue arrangement of claim 8 wherein the first block has at least two rounded corners that prevent grease from collecting on the first block.

10. The barbecue arrangement of claim 8 wherein the thermal management device further includes a second block connected to the bottom surface of the exterior of the firebox.

11. The barbecue arrangement of claim 10 wherein the second block has a resistor for heating the thermal management device.

12. The barbecue arrangement of claim 10 wherein the first block and second block of the thermal management device are held together using one or more fasteners that extend from the first block, through the firebox to the second block so that a portion of the firebox is positioned between the first block and the second block.

13. The barbecue arrangement of claim 7 wherein the at least one burner is powder coated with a high temperature polyester powder coat material.

14. The barbecue arrangement of claim 7 wherein the at least one burner is powder coated with a high temperature powder coat material consisting essentially of barium sulfate, carbon black and silica.

15. The barbecue arrangement of claim 7 further comprising a plurality of cooling fins connected to the bottom surface of the exterior of the firebox.

16. The barbecue arrangement of claim 15 further comprising one or more fans positioned relative to the plurality of cooling fins for blowing air past the plurality of cooling fins and removing heat.

17. The barbecue arrangement of claim 7 wherein the bottom surface of the exterior of the firebox and bottom surface of the interior of the firebox include a plurality of sloped sections that direct liquids toward a grease outlet.

18. The barbecue arrangement of claim 7 wherein the thermal management device is a cooling tube extending through the firebox, wherein the cooling tube has an inlet and an outlet and cooling fluid flows through the cooling tube and removes heat transferred from the at least one heat sink.

19. The barbecue arrangement of claim 18 wherein the at least one heat sink has a plurality of holes.

20. The barbecue arrangement of claim 18 further comprising:
an exhaust manifold for receiving cooling fluid from the outlet of the cooling tube;
a recirculation pump connected to the exhaust manifold for pumping cooling fluid;
a heat exchanger that receives cooling fluid from the recirculation pump and cools the cooling fluid, and
an intake manifold where the cooling fluid from the heat exchanger is collected and directed to the inlet of the cooling tube, wherein the recirculation pump moves the cooling fluid from the exhaust manifold to the heat exchanger and to the intake manifold.

21. A barbecue arrangement comprising:
a firebox having a bottom surface and at least one perpendicular side;
at least one burner slot formed on the bottom surface, the at least one burner slot extends from the bottom surface to an outside bottom surface of the firebox;
a cool air inlet guide adjacent from the at least one burner slot and extending perpendicular to the outside bottom surface;
at least one burner formed from aluminum for combusting fuel and emitting heat, and
an aluminum heat sink connected to the at least one burner and extending away from the at least one burner, wherein the aluminum heat sink extends through the at least one burner slot and past the outside bottom surface of the firebox so that a portion of the aluminum heat sink is outside of the firebox, while the at least one burner and a portion of the aluminum heat sink is inside of the firebox.

22. The barbecue arrangement of claim 21 wherein the at least one burner is powder coated with a high temperature polyester powder coat material.

23. The barbecue arrangement of claim 21 wherein the at least one burner is powder coated with a high temperature powder coat material consisting essentially of barium sulfate, carbon black and silica.

24. The barbecue arrangement of claim 21 further comprising:
at least one drip tray slot formed on the bottom surface of the firebox;
at least one grease trough formed of aluminum and connectable to the bottom surface of the firebox, the at least one grease trough has a top surface angled toward an outlet and a bottom surface with at least one aluminum heat sink that extends through at least one grease trough slot and past the outside bottom surface of the firebox so that a portion of the aluminum heat sink of the at least one grease trough is outside of the firebox, and
at least one drip tray formed of aluminum and having a top surface angled toward the at least one grease trough and a bottom surface with at least one aluminum heat sink that extends through the at least one drip tray slot and past the outside bottom surface of the firebox so that a portion of the at least one aluminum heat sink of the at least one drip tray is outside of the firebox.

\* \* \* \* \*